United States Patent [19]

Schmank

[11] 3,962,162

[45] June 8, 1976

[54] RIGIDLY BONDED GREEN CERAMICS AND PROCESSES

[75] Inventor: Horst W. Schmank, Ringold, Ga.

[73] Assignee: Minnesota Mining and Manufacturing Company, St. Paul, Minn.

[22] Filed: Feb. 19, 1974

[21] Appl. No.: 443,298

[52] U.S. Cl............... 260/22 CB; 106/41; 164/43; 260/40 R; 260/42.11
[51] Int. Cl.² ............... C08G 63/20; C08K 3/00
[58] Field of Search........... 260/22 CB, 42.11, 40 R, 260/22 A; 106/41; 164/43

[56] References Cited
UNITED STATES PATENTS

| | | | |
|---|---|---|---|
| 1,831,555 | 11/1931 | Earl | 164/43 |
| 2,358,002 | 9/1944 | Dearing et al. | 164/43 |
| 2,797,457 | 7/1957 | Kramer | 164/43 |
| 2,939,199 | 6/1960 | Strivens | 264/63 |
| 2,966,719 | 1/1961 | Park | 264/316 |
| 3,042,651 | 7/1962 | Martens | 260/872 |
| 3,179,990 | 4/1965 | Freeman | 164/43 |
| 3,285,873 | 11/1966 | Bailey | 260/42.11 |
| 3,383,344 | 5/1968 | Gill | 260/22 A |
| 3,428,110 | 2/1969 | Walker et al. | 164/43 |
| 3,645,937 | 2/1972 | Lang et al. | 164/43 |
| 3,689,611 | 9/1972 | Hardy et al. | 106/41 |
| 3,809,595 | 5/1974 | Nichols et al. | 260/40 R |

*Primary Examiner*—Ronald W. Griffin
*Attorney, Agent, or Firm*—Alexander, Sell, Steldt & DeLaHunt

[57] ABSTRACT

Thermosetting refractory compositions which require no drying are obtained from unpolymerized unsaturated polyesters and cross-linking vinyl monomers and desired refractories together with mold release materials. Organic fillers may be included to give more porous fired refractories. Danger of blistering of the thermoset shape on firing is counteracted by a volatile material which forms a reticulum of capillaries in the thermoset shape. Compositions may be used for extrusion, molding or injection, thermosetting occurring simultaneously or subsequently.

9 Claims, No Drawings

RIGIDLY BONDED GREEN CERAMICS AND PROCESSES

This invention relates to rigidly bonded green refractores and processes for the production thereof and more particularly to green ceramics which are made by extrusion, injection or die molding or equivalent processes. This invention also relates to compositions forming rigid green refractories by extrusion, injection or die molding or by equivalent processes. This invention also relates to processes for production of such compositions.

The ceramic arts are very old and for years commonly proceeded by molding or forming a ceramic powder either under pressure or mixed with enough fluid to assist in shaping. When clays of the correct types are used, water can effect sufficient adhesion between particles so that green shapes can be handled and manipulated. With the advent of technical ceramics such as titania, alumina, cordierite, zircon, mullite and such materials, it became less and less desirable to incorporate clay as an adhesive for the ceramic particles and it was finally discovered that thermoplastic organic compositions could be incorporated either directly or in solution. There were found to provide sufficient cohesiveness to the ceramic structures that many advantages flowed from their use and numerous improvements as to the particular materials were made. Thus, the casting of sheet materials as described by Park, U.S. Pat. No. 2,966,719, which sheet materials may well be described as "leathery" has been most helpful in production of many fine technical ceramics.

In addition to the use of thermoplastic materials, there has been occasional use of thermosetting materials perhaps well illustrated in Strivens, U.S. Pat. No. 2,939,199, who used several thermosetting binders including an epoxy resin, coumarone-indene resins and a Bakelite (presumably a phenolformaldehyde resin). An important aspect was an attempt as described therein was to recover a greater part of the molding vehicle by low pressure distillation or solvent extraction. A carbonaceous residue remained which was burned off during final firing. These were not used with high purity alumina and other similar technical ceramics where freedom from extraneous impurities and close approach to theoretical density may be required.

It is a principle object of this invention to provide compositions for forming rigid green ceramics particularly by molding, casting, extrusion or injection molding. Other objects will become apparent from the reading of this disclosure.

In accordance with objects of the invention, it has been found that especially useful compositions for forming rigid green refractories which are readily fired to refractory structures are obtained by binding refractory powders, ceramic or metallic, with thermosetting unsaturated polyesters and vinyl monomers and other additives in the following general ranges in percents by weight of the total compositions:

a. about 60–98% refractory powder;
b. about 1–30% unsaturated polyester;
c. about ½–12% unsaturated monomer for cross linking and dilution of polyester including suitable promoter (about 0.1 to 3% of the total composition when fast curing is desired);
d. about 0.02–0.5% catalyst for free-radical polymerization;
e. about 0.5–5% conventional internal mold release compound;
f. about 0.5–7% volatile mold release and lubricant.

When the refractory is ceramic, the ranges are (a) about 60–90% ceramic, (b) about 5–30% and (c) about 1–12% unsaturated monomer together with (d), (e) and (f). The higher ranges of refractory (90–98%) and lower of organic binders (1–5 and ½–1) are employed for metals.

The composition is mixed and shaped. Polymerization is initiated during shaping or thereafter usually below 200° C. The rigid green refractory obtained is fired at temperatures of 600° and higher to burn off organic matter and finally to sinter the refractory particles.

Another component which is usefully employed is 0.1 to 2% of a viscosity depressor or leveling agent.

Certain additional useful results may be attained by inclusion of 0.5 to 5% of a metal stearate acting partly as a mold-release but also as a mineralizer for the ceramic, e.g., depending upon the ceramic, zinc, magnesium, calcium or aluminum stearate and also by addition of a porosity controlling material such as an organic filler.

Particularly for extrusion purposes, it is advantageous to include a very small amount, 0.1 to 1% maximum, of water.

In certain aspects of the invention, it is contemplated that the process of making refractory compositions of the invention may be applied to any desired refractory material and that moldable compositions comprising any desired refractory will be readily formed. Preferred ceramics include alumina of 85% or greater purity, titania, cordierite and mullite and compositions firing to those materials. The procedure may be applied to metal powders such as tungsten, molybdenum, stainless steel, nickel, chromiun, gold, silver, etc., making allowances in proportions for the increased densities, i.e., the weight percent of metal may be up to about 98% and will usually be above about 90%, the other components being maintained in ratios as described. In all cases to avoid excessive shrinkage, the refractory materials ceramic or metal will be at sufficient concentrations that particles will be contiguous and touching one another. Although fillers have been used with unsaturated polyesters before, so far as known, none have been refractories or ceramics and the bonding of green refractories by thermoset unsaturated polyesters is believed to be entirely novel.

The thermoset green ceramics produced as one aspect of the invention are formed by initiating polymerization of the binder in a green shaped mass and then permitting polymerization to proceed. The most convenient methods are either by heating after forming or by forming while heating.

Shaping of the green mass, which may be referred to for convenience as an organically pugged ceramic, may be effected by any convenient techniques such as extrusion through a die, injection into a mold or cavity, molding a small portion of the unpolymerized mass under pressure or even using the unpolymerized mass as molding clay and sculpturing articles manually. The compositions of the invention are especially useful for techniques involving flow because of the desirable flow characteristics attained at low temperatures, e.g., 20–40° C. which characteristics are retained for a sufficient time to permit of storage for days. The compositions are such that polymerization and thermosetting are initiated by application of heat for a few minutes or less. Hollow objects may be made by employing a core of a fugitive material, e.g., polystyrene which melts and volatilizes below temperatures usually used for firing and coating the organically pugged ceramic on it.

The unsaturated polyesters employed in compositions of the invention are linear unsaturated polyesters produced by conventional methods from a glycol of 2 to about 21 carbon atoms and an unsaturated dibasic acid or anhydride of 4 to 5 carbon atoms such as maleic, fumaric, itaconic, citraconic or mesaconic acid and suitably modified by the inclusion of a saturated dibasic aliphatic or aromatic acid of about 4 to 10 carbon atoms such as succinic, methyl succinic, glutaric, adipic, pimelic, suberic, azelaic, sebacic, phthalic, isophthalic, terephthalic acid or cyclohexane dicarboxylic acid. The glycols include at least two hydroxyl groups and may include ether linkages, e.g., diethylene glycol, dipropylene glycol, triethylene glycol, polyethylene glycols and polypropylene-polyethylene glycols or relatively unreactive or unreacted hydroxyl groups as in glycerol and pentaerythritol which may provide a small degree of branching although the polyesters are still considered linear. The glycols may be acyclic as ethylene glycol, propylene glycol-1,2, propylene glycol-1,3, butanediol-1,4, dimethyl propanediol-1,3, butanediol-1,3, alicyclic as dimethylolcyclohexane, or aromatic as bis(hydroxyethyl) diphenylol propane or bis(hydroxyl propyl) diphenylol propane. Methods for production of such linear unsaturated polyesters are to be found, for example, in U.S. Pat. Nos. 3,042,651; 3,098,835 and 3,463,749 as well as in German O.S. 2,111,328. The polyesters employed in the compositions of the invention preferably have molecular weights in the range of about 400 to 10,000 and acid and hydroxyl numbers from about 5 to about 150. These polyesters are modified in viscosity and curing properties as is recognized in the art by inclusion in proportions of 10 to 90% of one or more unsaturated monomers, i.e., vinyl compounds, such as vinyl aromatic compound, e.g., styrene, methyl styrene, t-butyl styrene, di-vinylbenzene, diallyl phthalate or acrylate or methacrylate esters particularly alkyl esters in which the alkyl group contains 1 to 8 carbon atoms. Diallyl phthalate and methyl styrene (i.e., vinyl toluene) are preferred for low odor and relative cheapness.

A further modification is also contemplated as an embodiment of the invention, namely, the incorporation in the resin binder system of up to about 50% of the amount of polyester of a thermoplastic polyacrylate or polymethacrylate or acrylic substance such as an acryloid. Preferably the amount is about 10 to 35%. These thermoplastic materials which may be the partially polymerized methyl, ethyl, butyl or other acrylate or methacrylate monopolymer or copolymer are dissolved in a vinyl monomer and enter into the polymer formed when the binder system is polymerized. They are known to reduce shrinkage on polymerization. They help to provide more accurate replication of the die with smooth surfaces and are particularly useful in providing a more readily controlled burnout of the binder during the firing cycle. Numerous such polymers which are useful are known under commercial designations the structures of which are not revealed by the manufacturers other than as acryloids, acrylics and certain methyl and/or butyl methacrylates such as Elvacites. Very useful ranges of binder compositions include about 30–35% of a vinyl monomer such as vinyl toluene or diallyl phthalate in which are dissolved 70–65% (in proportions of 1:3) of acrylic polymer and unsaturated polyester.

The viscosity of the binder system, that is the unsaturated polyester, vinyl aromatic compound and other binders together is desirably in the range of 200 to 80,000 centipoises and preferably for compositions to be used in casting the viscosity is in the range of 200 to 5,000 centipoises whereas for use in molding and extrusion viscosities of 10,000 to 100,000 and particularly about 15,000 to 35,000 are preferred.

Promoters for the polymerization when fast curing is desired are generally tertiary amines such as dimethylaniline, dimethyl-p-toluidine, etc., and these are included in small amounts in the polyester, usually about 0.1 to 3% of the weight of polyester.

Catalysts for the vinyl polymerization are conventional free radical initiators including t-butylperoxide, benzoyl peroxide, dicoumyl peroxide, cyclohexane peroxide, t-butyl peroctoate. For very rapid curing, methyl ethyl ketone peroxide may be used. It will be recognized that compositions including catalyst may have relatively short life but the life should be adequate for use in the desired operation.

Compounding of a composition is easier and better release from molds or flow through dies is attained by incorporation of at least two classes of mold release agents. One is a conventional internal mold release compound and the other is a volatile mold release compound. A very suitable internal mold release material is an acidic polyphosphate ester such as the material commercially available under the tradename Zelec UN from E. I. Dupont de Nemours and Co. Other materials having equivalent properties may also be used such as zinc stearate, carnauba wax and commercially designated mold release compounds.

A useful volatile mold release compound is butyl stearate but in general it is contemplated that any oily material which volatilizes with no charring from about 120° to 200° C. will also be suitable such as methyl stearate, mineral and paraffin oils, chlorinated paraffin oil, dioctyl phthalate and various similar materials available in commerce. It is important that the volatile mold release material be compatible, and particularly miscible, with the fluid solution of polyester and monomers used. It is then expelled from solution during polymerization and appears to provide a reticulum of capillaries during volatilization so that subsequent firing can proceed without danger of rupture of the green ceramic during decomposition of polymerized binder.

The use of a levelling agent or viscosity depressor is optional but nonetheless very desirable. Conventional levelling agents as used in coatings such as paint may be used. A 90% solution of sucrose acetate isobutyrate in ethanol (commercially available as SAIB-90) or sucrose benzoate may be used effectively.

A reduction in the amount of polyester employed is effected by reducing the affinity of the ceramic powder for the polyester by addition of about enough water to form a monomolecular film of water over the surface of the ceramic powder. For example, it is calculated that spherical particles of alumina of uniform 0.3 $\mu$ diameter will have a surface area of 5m$^2$/gm and will require 1.2 gms of water for 1,000 gm of ceramic powder. It is calculated that 1.5 $\mu$ particles about 0.04 g water/kg to provide monomolecular layers. The water is added at the last stage of mixing and blended thoroughly. Ordinarily, water is avoided when working with polyesters and hence the discovery that it is useful in green ceramic compositions is rather unexpected.

The preferred procedure for mixing materials is to blend ceramic powder and dry powdered additives, particularly mineralizers in the form of metal stearates if they are used and organic fillers such as four, cellulose, nut shell flour, cotton seed linters, etc. A standard mixing machine such as a muller mixer is used. The binder mixture is prepared separately adding the acidic internal mold release material and if used, the levelling agent. The catalyst or a solution of the catalyst in a suitable solvent, e.g., a phthalate ester, is then added. The binder is then slowly milled into the dry ceramic materials until good wetting is obtained. The lubricant such as butyl stearate is then added and milling continued until homogeneity is achieved (depending on size of batch, usually from 5 to 30 minutes). The composition is stored in airtight containers and in most instances, has a life of 3 to 4 weeks at normal temperatures of about 20° C. before any spontaneous gelation occurs unless a very active catalyst is used or a high level of MgO, CaO or transition metal oxide is present.

As noted above, the ceramic powder constitutes 60 to 90% by weight of the final composition and it is preferred that this be as high as possible consistent with obtaining adequate wetting by the binder and suitable consistency for the method of forming to be used. A rather stiff pasty material is most amenable to extrusion and molding techniques. The actual composition will depend in large measure on the particular refractory. The higher the specific gravity of the refractory itself, the higher the percentage in the green composition. Metals are generally to be used at higher percentages than ceramics.

Ordinarily, when dense ceramics are to be produced by firing to maturity, that is sintering fully or vitrifying to give a dense material, the solid ceramic material present will be substantially the only residue on removal of the binder during the heating cycle. If a porous ceramic is desired, greater or less amounts of a pulverulent organic material may be incorporated which will only be burned out after the organic binder has been destroyed, usually at about 400°–500° C. Ordinary flour is quite satisfactory for this purpose as are also wood flour, pecan shell flour and such similar finely divided conbustible materials as hereinelsewhere noted. Preferably materials of low ash content are employed. Such materials may constitute from about 5 to 25% weight of the total green ceramic composition. It will be recognized that because of the low specific gravity of these organic fillers, a large percentage will displace a relatively much greater weight of ceramic powder and result in a very porous ceramic. In general, amounts of about 5 to 15% are sufficient to give a porous ceramic for use as a catalyst support.

Having described the invention in broad terms, it is now more specifically illustrated by examples of compositions which are molded by injection or compression or are extruded through dies and then cured, burned and fired without intermediate drying steps.

EXAMPLE 1

Unsaturated polyesters of the type used in this invention are conventionally available commercially as premixes, for example, from Koppers Company, Inc., with a wide range of characteristics. These premixes include the unsaturated polyester itself formed particularly from maleic anhydride with or without a few percent of fumaric acid and a slight excess over stoichiometric, of the order of 5–15 mole % of dipropylene glycol with or without propylene glycol. The unsaturated polyester is dissolved in from about 5 to 70%, preferably 10 to 50% of an aromatic vinyl monomer usually vinyl toluene or diallyl phthalate or a combination of the two to provide the commercially available polyester premix. One such composition non-acrylic modified designated as Koppers Resin 309–108 is employed as being typical of useful materials. It is believed to be derived from about 95% maleic–5% fumaric acids with about 10 mole percent excess of the combination of dipropylene glycol 2% propylene glycol polyester dissolved in about 30% of diallyl phthalate. The viscosity is 12,500 centipoises at 25° C., hydroxyl number is 50, specific gravity about 0.95–1. In general, the composition or structure is less important to satisfactory results than hydroxyl number and viscosities in the ranges specified above. Those skilled in the polymer art will readily perceive modifications that can be made in the polyester premixes to attain particularly desired characteristics.

A solution is prepared from 519 grams of polyester premix 309–108, 6 grams benzoyl peroxide, 147 grams sucrose acetate isobutyrate (the 90% solution available as SAIB 90 from Eastman Kodak Chemical Co. is referred to in each case) and 141 grams of acidic polyphosphate internal mold release (available commercially as Zelec UN). In a muller mixer are placed 7,000 grams of 99.5% aluminum oxide powder of 3 micron average particle size and the solution of polyester is added to the powder and mixing is continued for 10 minutes during which time 217 grams of butyl stearate are added. When water is included, that is when the aluminum oxide has little or no moisture percent and is dry, water is added at this point in an amount of about 0.6 to 0.7% or less of the weight of the aluminum oxide depending on particle size and surface area. The green ceramic mixture can be stored at room temperature for several days before use. It is extruded through a suitable die at 600 psi (42 kg/cm$^2$) to give a structure having approximately 1.5 mm. square openings with walls about 0.3 mm. thick. After curing at 138° C. for 10 minutes, the polyester is fully set and a rigid green ceramic with square passageways is obtained. It is cut into sections about 10 cm. long and fired to about 1600° to 1650° C. to burn out polymer and mature the ceramic. This provides an alumina ceramic.

A further series of extrudable compositions are made following the above procedure using 1500 gm. aluminum oxide, 260 gm. 309–108 polyester premix, 65 gm. SAIB 90, 3.5 gms. benzoyl peroxide, 64 gm. Zelec UN for the basic mixture prepared as described above and then incorporating additional ingredients as shown in Table I.

Table 1

| Example | 2 | 3 |
|---|---|---|
| Butyl Stearate (gm) | 75 | 60 |
| Mineral oil (gm) | 8 | 8 |
| Water (gm) | — | 10 |

Each composition is extruded as above at about 35 kg/cm$^2$ to give structures which are cured at 138° C. for 30 minutes. They are fired to alumina structures as in Example 1.

A series of compositions are prepared using a commercially available 99.9% alumina. The procedure in each case is like that described in Example 1 and the material used and amounts in grams are set forth in Table 2. A different polyester premix 3801 in which the vinyl aromatic is about 25% vinyl toluene is used in Example 6.

Table 2

| Example | 4 | 5 | 6 |
|---|---|---|---|
| Ceramic powder | 2800 | 2500 | 12,000 |
| Resin 309-108 | 225 | 225 | — |
| Resin 3801 | — | — | 1,800 |
| Viscosity depressor (1) | 6 | 6 | 50 |
| Internal mold release (2) | 60 | 75 | 80 |
| Benzoyl peroxide | 3 | 3 | 20 |
| Lubricant (3) | 75 | 75 | — |
| Magnesium Stearate | 28 | 12.5 | 120 |
| Aluminum Stearate | 28 | — | 120 |
| Water | 40 | — | — |

(1)SAIB 90
(2)Zelec UN
(3)Butyl Stearate

These compositions are molded into thread guides (Examples 4 and 5) and crucibles (Example 6) at pressures of 21, 35, and 42 kg/cm² respectively using a die temperature of about 120°–130° C. and 2 minutes cure time. The molded pieces release well and provide good rigid green shapes. They are fired at about 1550° C. for 2 hours to densities of 3.85 to 3.87 will about 15.5 to 16.5% shrinkage. The average crystal size of the thread guides of Example 5 is 1.08 microns.

EXAMPLE 7

A green ceramic composition of the invention is made using 16 kg. of 96% $Al_2O_3$ (including talc and clay), 2 kg. resin 309-108, 50 gm. SAIB 90, 125 gm. Zelec UN, 10 g. benzoyl peroxide 80 gm. of butyl stearate, 160 gm. of aluminum stearate and 100 gm. of calcium stearate. This is extruded into a die for a thread guide at about 49 kg/cm². The die is at about 138°–143° C. and curing of the polymer to a thermoset condition is complete in about 1 minute. The rigid green ceramic is removed readily from the mold and is fired with about 12% shrinkage at about 1680° C for 2 hours to provide an alumina thread guide.

A series of examples tabulated in Table 3 (weights in grams) are run as described in Example 1 using 96% $Al_2O_3$ as above in Example 7 with variations in amounts of materials used and in some cases in the materials used.

Table 3

| Example | 8 | 9 | 10 | 11 | 12 | 13 |
|---|---|---|---|---|---|---|
| $Al_2O_3$ | 1600 | 1600 | 1600 | 1600 | 2400 | 2400 |
| Resin 3801 | — | 210 | — | 280 | — | — |
| Resin 309-108 | 240 | — | 260 | — | 390 | 390 |
| SAIB 90 | 6 | 6 | 8 | 8 | 12 | 12 |
| Zelec UN | 36 | 16 | 40 | 20 | 60 | 90 |
| Benzoyl peroxide | 1.5 | 1.5 | 2.5 | 2.5 | 4 | 4 |
| Butyl Stearate | 20 | — | 10 | 10 | 15 | 20 |
| Magnesium Stearate | 16 | 16 | 16 | 16 | 24 | 24 |

Each batch is first extruded into rod-shaped pieces to help in deaerating the mixture and is then cut into nut-sized pieces for ease in loading an injection molding machine. Example 9 requires a rather higher pressure because of the absence of butyl stearate. The green ceramic compositions of Example 8, 9 and 10 are injected into dies, heated at about 150° C. to mold rods which can be used for resistor cores and cured for 1 to 2 minutes. The molded pieces release well from the molds and are fired as in Example 7 to give alumina rods of about 3.76 specific gravity.

The compositions of Examples 11, 12 and 13 are molded as thread guides are fired as in Examples 4, 5 and 6 and provide suitable pieces.

A series of titania compositions is prepared using titania powder of about 3–4 micron size and about 99.5% purity. The mixing procedure as described above is used and the compositions in grams are tabulated in Table 4.

Table 4

| Example | 14 | 15 | 16 |
|---|---|---|---|
| Titania | 2200 | 2200 | 14000 |
| Resin 309-108 | 300 | 270 | 1800 |
| SAIB 90 | 25 | 22.5 | 50 |
| Zelec UN | 46 | 52 | 84 |
| Benzoyl peroxide | 3 | 3 | 21 |
| Butyl Stearate | 35 | 32 | — |
| Calcium Stearate | 20 | 22 | 150 |
| Vinyl Toluene | — | — | 100 |
| Water | 10 | 10 | — |

The compositions of Examples 14 and 15 are molded to thread guides as in Examples 4, 5 and 6. They are fired at about 1330° C. and show about 20–22% shrinkage on firing. The thread guides produced are fully satisfactory. The composition of Example 16 is molded into sheets in a molding machine having two heated plates. Firing is at about 1270° C. The parts are fully satisfactory.

EXAMPLE 17

A cordierite ceramic mix is prepared by blending 480 gm. ball clay, 240 gm. alumina and 480 gm. talc in a muller mixer and then adding 40 gm. of a conventional wheat flour. To the mixer is added a separately prepared mixture of 205 gm. unsaturated polyester premix 309-108, 41 gm. sucrose acetate isobutyrate, 35 gm. internal mold release Zelec UN and 9.5 gm. of 40% solution of benzoyl peroxide. Addition is made rather slowly and blending is permitted to continue for 10 minutes after all the liquid has been added at which time 57 gm. of butyl stearate is added, mixing continued for a further 10 minutes, 10 gm. water added and mixing and blending again continued for 10 minutes. A fairly stiff plastic mass is obtained which is extruded at 35 kg/cm² in the form of tubes and rods. Sections of the extruded articles are heated in an oven or drier at about 120°–135° C. to effect polymerization of the binder system and provide rigid green ceramic parts. These parts are fired conventionally in a kiln to 1320° C. for 2 hours with relatively slight shrinkage to provide tubes and rods of cordierite.

EXAMPLE 18

A mixture for conversion to mullite is prepared using 2415 gm. clay powder blended with 2585 gm. alumina powder to which is added a mix of 750 gm. unsaturated polyester premix containing 30% diallyl phthalate, 216 gm. each of Zelec UN and sucrose acetate isobutyrate and 10 gm. benzoyl peroxide. After mixing for 10 minutes, 250 gm. butyl stearate is added and stirring is continued until a homogeneous plastic mix is obtained. The mix is desired for 2 minutes in an extrusion press and extruded at 42 kg/cm² as a tube approximately 19 mm. outside diameter and 7.6 mm. inside diameter. The tube is heated to form a rigid green ceramic as above. Further portions of the plastic mix are molded at about 14 kg/cm² pressure for 1 minute in a die for a crucible held at about 150° C. The molded crucibles have excellent green strength. Tubes and crucibles are fired for 2 hours at 1680° C. with relatively little shrinkage to provide articles of mullite.

EXAMPLE 19

Articles of metal are made from metal powders using procedures as described above for ceramics. A mix of 25 gm. polyester premix 309–108, 3 gm. sucrose acetate isobutyrate, 5 gm. Zelec UN and 0.3 gm. benzoyl peroxide is mixed in a mortar and pestle with 500 gm. of tungsten powder. To the mix is then added 3 gm. of butyl stearate which gives a very plastic dough which is molded into crucible forms as in Example 18 holding it in the die for 1.5 minutes. The green crucibles have good strength, they are fired to tungsten crucibles with about 76% of theoretical density by firing to 1400° C. over about 4 hrs. in a hydrogen atmosphere of over 100° dewpoint.

Powdered molybdenum metal is used in the same proportions to provide molybdenum crucibles. Both such mixes are molded to flat sheets between platens followed by the same firing cycle.

EXAMPLE 20

A cordierite composition is prepared as in Example 17 from 480 gm. ball clay, 240 gm. alumina and 480 gm. talc in a muller mixer and to it is added slowly a solution of 126 gm. unsaturated polyester 3801 (Example 6; including vinyl toluene), 84 gm. of a 40% solution of Elvacite 2013(methyl/butyl methacrylate copolymer with inherent viscosity of 0.20 at 20° C. from E. I. duPont de Nemours Co.) in vinyl toluene, 41 gm. sucrose acetate isobutyrate, 35 gm. Zelec UN and 9.5 gm. benzoyl peroxide. Elvacite 6026 which is a copolymer of about the same composition with inherent viscosity of 0.26 can also be used. The mixture is blended for a further 10 minutes and then 57 gm. of butyl stearate is added followed after a period of blending by 13 gm. of water and finally by blending to a plastic dough. The dough is extruded as a tube through a 2.642 cm. (1.040 in.) outside diameter die at 19.2 kg/cm² and cured at 132° C. to a rigid green ceramic 2.611 cm. in outside diameter.

This procedure is repeated using identical proportions with other commercially available acrylics, namely, Rohm and Haas KM323 acrylic (said to be an acryloid) and Elvacite 2044 (n-butyl methacrylate monopolymer with inherent viscosity of 0.53 from du Pont). Extrusion pressures are 31.5 and 28.0 kg/cm² respectively and the outside diameters of the rigid green tubes are 2.619 and 2.621 cm. respectively.

EXAMPLE 21

An alumina ceramic is prepared from 15 kg. alumina powder (5 to 6 micron) blended with 150 gm. each of calcium stearate and aluminum stearate by adding slowly a previously prepared solution of acrylic modified unsaturated polyester available commercially from Rohm and Haas Co. under the designation P,19 supposedly formed from P,340 (1040 gm.) and P,681 (760 gm.) with 20 gm. benzoyl peroxide, 85 gm. Zelec UN and 50 gm. sucrose acetate isobutyrate. After thorough blending, 75 g. butyl stearate is added and blended to give a stiff dough. The dough is molded to corrugated sheets 0.2 mm. thick at about 14 kg/cm² pressure and 150° C. for 1 minute. The corrugated sheets are strong and release well from the die with no significant shrinkage. They are fired to corrugated ceramic sheets.

What is claimed is:

1. A formable green refractory composition flowable at temperatures of 20° to 40° C., curing to become rigid and shape-retentive at elevated temperatures below about 200° C. and firing at temperatures above at least 600° C. to refractory, said composition being thermosetting and comprising in percent by weight:
   a. about 60 to 98% refractory powder;
   b. about 1 to 30% linear unsaturated polyester having molecular weight of about 400 to 10,000 and hydroxyl numbers from about 5 to about 150;
   c. about ½–12% unsaturated vinyl monomer for crosslinking and dilution;
   d. about 0.02 to 0.5% catalyst for free radical polymerization;
   e. about 0.5 to 5% internal mold release compounds and
   f. about 0.5 to 7% volatile mold release and lubricant miscible with said saturated polyester and said vinyl monomer.

2. The composition of claim 1 wherein unsaturated monomer for cross-linking is at least partly diallyl phthalate.

3. The composition of claim 1 wherein unsaturated monomer for cross-linking is at least partly vinyl-toluene.

4. The composition of claim 1 wherein the unsaturated polyester is modified by inclusion of up to 50% its weight of acrylic modifier.

5. The composition of claim 1 additionally containing viscosity depressor or leveling agent.

6. The composition of claim 1 wherein the refractory is refractory ceramic in an amount of about 60 to 90%, the unsaturated polyester is in an amount of 5–30% and unsaturated monomer is 1–12%.

7. The composition according to claim 6 additionally comprising 0.5 to 5% of metal stearate.

8. The composition according to claim 6 additionally including water in an amount sufficient to provide an approximately monomolecular layer on the surface of the refractory ceramic.

9. The composition according to claim 1 additionally including polymerization promoter in an amount of from about 0.1 to 3% by weight of said composition.

* * * * *